VIDEO TRANSDUCER INCLUDING HIGH AND LOW FREQUENCY SYSTEMS

Original Filed Sept. 10, 1962 2 Sheets-Sheet 1

INVENTOR.
Eduard Schüller

BY
Spencer & Kaye
ATTORNEYS

March 5, 1968 E. SCHÜLLER 3,372,243

VIDEO TRANSDUCER INCLUDING HIGH AND LOW FREQUENCY SYSTEMS

Original Filed Sept. 10, 1962 2 Sheets-Sheet 2

INVENTOR.
Eduard Schüller

BY Spencer & Kaye

ATTORNEYS

3,372,243
VIDEO TRANSDUCER INCLUDING HIGH AND LOW FREQUENCY SYSTEMS

Eduard Schüller, Wedel, Holstein, Germany, assignor to Telefunken Patentverwertungs-G.m.b.H., Ulm (Danube), Germany Original application Sept. 10, 1962, Ser. No. 224,464, now Patent No. 3,255,307, dated June 7, 1966. Divided and this application Jan. 14, 1964, Ser. No. 351,880
Claims priority, application Germany, Sept. 8, 1961, T 20,724
8 Claims. (Cl. 179—100.2)

ABSTRACT OF THE DISCLOSURE

A rotatable magnetic head arrangement for the scanning of broad band signals in the form of a succession of magnetic traces carrying magnetic fields having but a single direction of magnetization and varying according to the entire frequency range of the board band signal, the head arrangement including two annular magnetic systems each having an air gap, the two system air gaps extending parallel to one another and being at least partially coextensive, one magnetic system being responsive to the high frequency portion of the signal band and the other magnetic system being responsive to the low frequency portion thereof.

The present invention relates generally to the recording art and, more particularly, to the recording of broad band signals, wherein there is high relative speed between the record carrier or the magnetic tape and the magnetic head arrangement, such as in arrangements for the magnetic recording of television or video signals and sound or audio signals.

In the scanning of broad band signals for reproduction purposes, it is known to provide a high relative speed between a record carrier and a magnetic head arrangement so that the length of tape will be relatively small or short in order to avoid the necessity for using large and cumbersome reels. In one known device, an attempt is made to fulfill this requirement by providing recording rows disposed substantially at right angles to the travelling direction of the tape. This is accomplished by a magnetic system including four magnetic heads. The system rotates at high speed about an axis which is parallel to the travelling direction of the tape-type recording carrier. A stationary magnetic head is provided for the recording of sound and, in a manner which is known per se, this head records a track close to the edge of the tape while the tape travels from one reel to the other.

However, this type of known device has a number of disadvantages. As an example, the positions of the four rotating magnetic heads have to be adjusted very accurately with respect to each other and they also have to be reset from time to time due to wear. Furthermore, synchronization is very difficult to achieve and requires a considerable amount of electronic parts, in addition to a further track which is lost for useful recording, similar to the sound track provided on a film strip. Due to this, the price of the device becomes extraordinarily high. Furthermore, cutting and gluing of the magnetic tape, that is editing, is a very complicated technique if it is to be done without the loss of synchronization.

Since television signals include frequencies from the lower limit of the audible range to about 5 megacycles, difficulties are also encountered when scanning or reproducing the signals which have been recorded. There are two reasons for these difficulties: (1) the wavelengths which are recorded and which correspond to the low frequencies are so long at the high tape-head speed, that they can no longer be fully detected by the pole shoes of the head; and (2) the voltage which is induced in the scanning or reproducing head is proportional to the frequency and, thus, the low frequencies are handled at a disadvantage. The number of windings on the scanning head could be increased in an attempt to increase the induced voltage at these low frequencies; however, such a measure is limited due to the corresponding decrease in the resonant frequency of the oscillating circuit which is formed by the winding and the winding capacitance. This resonant frequency is to be close to the upper limit of the frequency range.

Because of this, in the known device described above, a carrier frequency is used which is frequency modulated with the broad band frequency spectrum to be transmitted. This modulation is done before recording. Notwithstanding the fact that the expense is considerable, because subsequent to reproduction or scanning demodulation must be carried out, the head-tape speed must be still further increased in order to be able to scan the carrier frequency, which must be higher than the highest signal frequency which is to be recorded.

It is also known to divide the frequency band into a plurality of bands and to record or scan these bands in several tracks extending parallel to the edges of the tape. This was accomplished by using separate stationary magnetic heads. This method was not successful, nor was it widely used in practice because it requires a rather complicated transport mechanism due to the need for extreme accuracy in the tape speed. Such accuracy is very difficult to fulfill and is created because of the high tape speed which is necessary. This, in turn, results in the use of a great deal of tape and thus in the necessity for large and cumbersome reels.

A further disadvantage is that in this arrangement also, a carrier frequency is used which is frequency modulated at least with that channel which contains the lower frequencies. Thus, the magnetic heads can be adjusted to the respective frequency ranges, but there may be a problem due to phase differences which can occur between the channels due to various influences, such as, for example, inaccuracies in the travel of the tape. Such phase differences will change the generally pulse-shaped signal, which is composed of many frequencies, and would thus lead to disturbances in the picture.

With these defects of the prior art in mind, it is a main object of the present invention to provide an improved wideband tape scanning arrangement.

A further object of the invention is to provide an arrangement wherein no storage capacity for picture image information is lost.

These and other objects according to the present invention are achieved by the provision of various embodiments of a scanning or reproducing head which can be used for the scanning of broad band television signals. This head is an annular recording system provided with a winding and is connected with a second annular system also provided with a winding. The connection between the two systems is such that the magnetic circuit of one of the annular systems is closed across the pole ends and the air gap of the other annular system. Also, the rearward or revertive magnetic resistances of the two systems, considered with reference to the effective air gap common to both of them, are arranged to be so different that the magnetic fluxes are distributed between the two circuits in dependence upon the frequency.

Preferably, a soft magnetic material is used as a core for the first system for scanning low frequencies, and a ferrite suitable for high frequencies is used in the other system.

Additional objects and advantages of the present invention will become apparent upon consideration of the following description when taken in conjunction with the accompanying drawings in which.

Figure 4A:
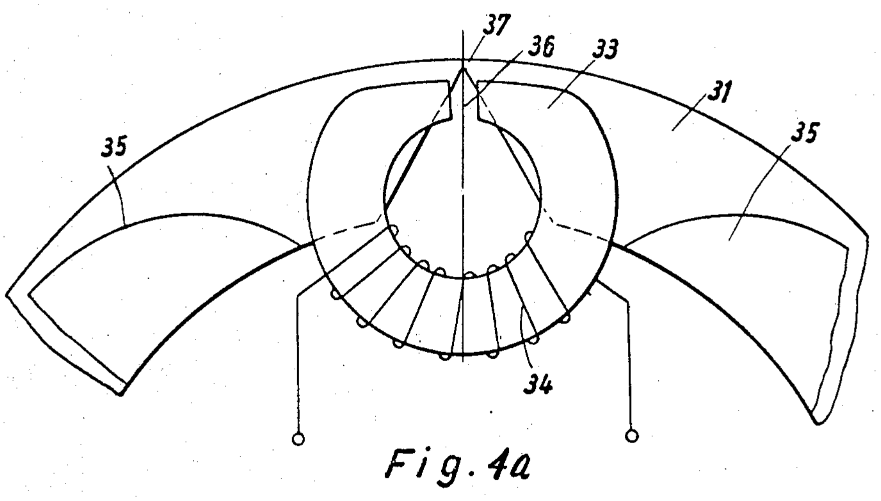
Figure 3:
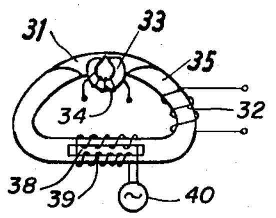
FIGURE 3 is a schematic elevational view of a magnetic head arrangement constructed in accordance with the present invention.

FIGURE 4*a* is an enlarged side elevational view of the air gaps of the head arrangement of FIGURE 3.

Figure 4B:
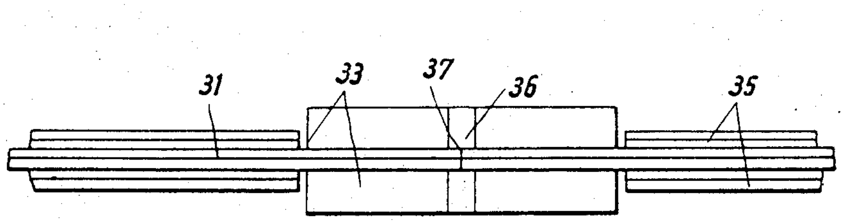

FIGURE 4*b* is a plan view of the structure illustrated in FIGURE 4*a*.

Figure 5:
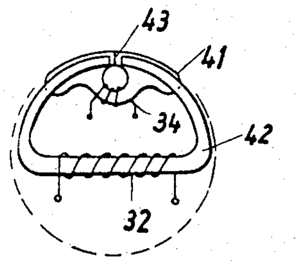

FIGURE 5 is a schematic elevational view of another embodiment of a head arrangement.

Figure 1:
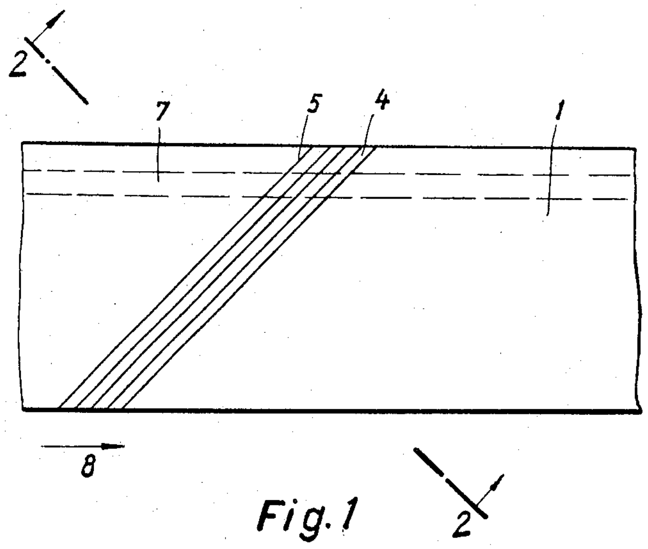
FIGURE 1 is a schematic elevational view of a section of the magnetic tape of the present invention.
Figure 2:
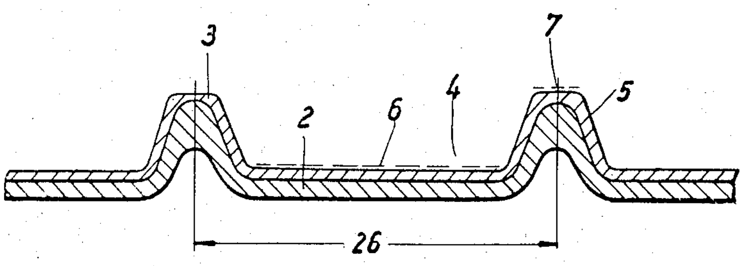
FIGURE 2 is an enlarged vertical sectional view taken substantially along the plane defined by reference line 2—2 of FIGURE 1.

With more particular reference to the drawings, FIGURES 1 and 2 illustrate a magnetic tape 1 which is provided with a carrier 2 and a magnetizable layer 3 thereon, the construction of this tape being that of conventional magnetic tapes. This tape is to be moved in the direction of arrow 8. Elevated or bridge portions 5 are impressed into the tape and are disposed at an angle to the direction in which the tape is to travel, these elevated portions being parallel to and spaced from one another. The particular angle at which these are disposed to the running direction is determined by the drive mechanism which is utilized.

Grooves 4 which may have a depth of about 0.1–0.2 mm. are formed between adjacent elevated or bridge portions 5 which may have a width of about 0.1 mm., and the television picture or image information 6 is recorded on the planar bottom of grooves 4. The bridges 5 guide the rotating magnetic head arrangement which is used with this type of tape. The surfaces of the bridges 5 are also planar and are used for recording the sound information 7. Thus, a track of sound information is provided which extends at an oblique angle to the trapezoidal bridges 5 and parallel to the edge of the tape.

FIGURES 3, 4*a* and 4*b* illustrate details of a magnetic head including a system 31 used for scanning the low frequencies and which is constructed of one or several laminates of soft magnetic material which may have a diameter of about 20–30 mm. The dimensions are such that the outer surface, which is at right angles to the plane of the laminates, forms approximately half of the body of rotation which touches the magnetic tape when the device is in operation and when the tape portion being scanned is wound around a hollow cylinder in which the head is rotatably disposed. Due to the large loop which is provided the scanning of large band or tape wavelengths is possible.

The yoke of this system 31 is provided with a winding 32 of about 10 kilo ohms having a large number of coils which is such that the resonant frequency of the oscillation circuit formed by the winding and the winding capacity is disposed in the vicinity of the limit frequency of the channel containing the low frequencies, for example, at 20 kilocycles. A window 38 may be provided in the yoke in a manner which is known per se. This window may carry an auxiliary winding 39 provided with such a current from source 40 that the portions of the yoke around which it is wound are magnetized to saturation. Such a circuit is shown in FIGURE 1 of U.S. Patent No. 2,870,267 issued to S. Duinker et al. on Jan. 20, 1959. Then, if a magnetic flux occurs through the head because of a magnetic field present at the gap, this flux will occur through the magnetic auxiliary circuit connected between the head halves, and even numbered harmonics are created in the auxiliary circuit which pass to the main circuit and induce a voltage in winding 32. Thus, with the use of this system, frequencies down to the values of zero may be scanned.

Because of the eddy currents which take place in the soft magnetic material, the high frequencies pass on to the system 33 which includes a ferrite suitable for high frequencies and is also ring shaped, but it is substantially smaller in dimensions than the system 31. The high frequency system 33 is constructed of two congruent portions and extends substantially only over the pole ends of system 31. These pole ends are chamfered or sloped toward the interior. The gap 36 of system 33 is disposed parallel to the gap 37 (about 1–2 $\mu$m. wide) of system 31 and is broader (about 20–30 $\mu$m. wide) than the latter gap. The high frequency system 33 having an outer diameter of about 5 mm. is provided with a winding 34 containing only a few coils (about 100 windings) and is tuned to approximately the upper limit frequency of the channel containing high frequencies which may be, for example, two megacycles.

During the scanning of the magnetic tape, the flux passes across the operating air gap 37 which is common to both systems and into the magnetic circuits. It is divided between the two systems on the basis of the rearward or revertive magnetic resistances which are different when considered with respect to the gap 37 as they depend on frequency. Due to the high permeability of material 31, the magnetic resistance of low frequency system 31 is maintained small outside of the system 33 at low frequencies.

Another magnetic head is illustrated in FIGURE 5 using the same principles as the head which is illustrated in FIGURE 3. However, in this construction the advancing or moving surface which is disposed against the recording carrier or the magnetic tape is provided with an air gap 43 and is represented by a system 41 which is of ferrite, while the system 42 comprises a soft magnetic material and serves to scan the low frequencies. This system is set back from the first and includes a system 41 between its laminates.

The magnetic head arrangements which are described above may be used in all systems in which broad band signals are to be utilized. However, these novel arrangements are particularly useful in devices constructed in accordance with that of FIGURE 3 of my above-mentioned Patent No. 3,255,307 in which the magnetic head arrangement rotates in a cylinder and wherein the cylinder is encircled by a magnetic tape, the tape running onto the cylinder in an oblique direction and extending about it for 360°. The reason for this is that the pole surfaces adjacent the air gap always lie against the magnetic tape for all of their length and can be constructed sufficiently large so as to be able to scan large wavelengths.

It will be understood that the above description of the present invention is susceptible to various modifications, changes, and adaptations, and the same are intended to be comprehended within the meaning and range of equivalents of the appended claims.

What is claimed is:

1. A rotatable magnetic head arrangement for the scanning of broad band signals which are recorded in tracks on magnetic tape, which tracks are scanned in succession and form an angle with respect to the outer edges of the magnetic tape, each track containing a single trace having magnetic fields extending in but a single direction and varying according to the entire frequency range of the broad band signal, said arrangement comprising a first annular magnetic system having a winding and an air gap, a second annular magnetic system having a winding and an air gap extending parallel to, and at least partially coextensive with, the air gap of said first system, said systems being arranged so that the magnetic circuit of one of the systems is closed via the pole ends and the air gap of the other system, the revertive magnetic resistances of the two systems, considered with reference to the common air gap, being different such that the magnetic flux is distributed among the two circuits in dependence upon the frequency.

2. A magnetic head arrangement as defined in claim 1 wherein one system is for scanning low frequencies and is of soft magnetic material, and the other system is for scanning high frequencies and is of ferrite which is suitable for high frequencies.

3. A magnetic head arrangement as defined in claim 2 wherein the winding of the system for the low frequencies is of a high ohmic value, with an inherent resonance in the vicinity of the border frequency of the low channel, and the winding of the system for the high frequencies has a few windings and is tuned to approximately the upper border frequency of this channel.

4. A magnetic head arrangement as defined in claim 2 wherein the system for the low frequencies is arranged so that the voltage induced in the winding is proportional to the magnetic flux entering the system.

5. A magnetic head arrangement as defined in claim 2 wherein said system for the low frequencies includes an auxiliary magnetic circuit which is magnetized to saturation and disposed in the rearward portion thereof.

6. A magnetic head arrangement as defined in claim 2 wherein said one system for scanning the low frequencies includes laminates whose outer surfaces which border at the air gap at the same time form a substantial portion of a body of rotation for touching the magnetic tape, corresponding to the longest wavelength to be scanned.

7. A magnetic head arrangement as defined in claim 6 wherein the ferrite system includes two annular bodies disposed against the laminated system at both sides thereof and which are open toward the air gap of this laminated system, said annular bodies having smaller dimensions and extending essentially only over the pole ends of the laminated system.

8. A magnetic head arrangement as defined in claim 6 wherein the system for scanning the high frequencies is arranged betwen the laminates of the system for scanning the low frequencies and forms a substantial portion of a body of rotation for touching the magnetic tape with its outer surfaces bordering at the air gap.

References Cited

UNITED STATES PATENTS

| | | | |
|---|---|---|---|
| 1,828,189 | 10/1931 | Kiliani | 179—100.2 |
| 2,351,006 | 6/1944 | Camras | 179—100.2 |
| 2,870,267 | 1/1959 | Duinker et al. | 179—100.2 |
| 2,975,241 | 3/1961 | Camras | 179—100.2 |
| 3,013,123 | 12/1961 | Camras | 179—100.2 |

OTHER REFERENCES

W. E. Stewart: Magnetic Recording Techniques, McGraw-Hill, New York, 1958, pp. 70–73.

BERNARD KONICK, *Primary Examiner.*

L. G. KURLAND, J. R. GOUDEAU, *Assistant Examiners.*